United States Patent
Miyazaki

[15] 3,685,372
[45] Aug. 22, 1972

[54] AUTOMATIC TRANSMISSION

[72] Inventor: Toshio Miyazaki, No. 714, Nishiterao-cho, Kanagawa-ku, Yokohama, Japan

[73] Assignee: Nissan Motor Company, Ltd., Yokohama, Japan

[22] Filed: May 19, 1970

[21] Appl. No.: 38,848

[52] U.S. Cl. .................74/863, 74/869, 137/596.2
[51] Int. Cl. .....................B60k 21/00, F17d 1/00
[58] Field of Search ............74/863, 864; 137/596.2

[56] References Cited

UNITED STATES PATENTS

| | | | |
|---|---|---|---|
| 3,561,295 | 2/1971 | Iijima | 74/864 UX |
| 3,158,037 | 11/1964 | Searles | 74/864 |
| 3,473,566 | 10/1969 | Peppel | 137/596.2 |
| 3,495,481 | 2/1970 | Ohie et al. | 74/864 |

Primary Examiner—Arthur T. McKeon
Attorney—McCarthy, Depaoli, O'Brien & Price

[57] ABSTRACT

Automatic multi-ratio transmission control system offering powerful braking on the engine at an early stage of deceleration and smoothing the transition from the low speed ratio to the intermediate speed ratio. The control system includes a throttle vacuum sensitive valve for controlling the throttle pressure in the circuit thereof and a throttle backup valve for controlling the operation of the throttle valve by furnishing modulated pressure thereto in accordance with the driving conditions selected.

3 Claims, 4 Drawing Figures

AUTOMATIC TRANSMISSION

This invention relates to automatic power transmission of a motor vehicle and particularly to an improved hydraulic control system of the transmission.

Prior automatic multi-ratio power transmissions are employed in motor vehicles to reduce driver effort in vehicle operation by automatically and efficiently conditioning multi-ratio gearing to meet varying driving conditions. However, these power transmissions have failed to offer powerful and effective braking on the engine at an early stage of deceleration. Moreover, they have also failed to streamline the shifting from the low speed ratio to the intermediate speed ratio when an up-shift is to be accomplished.

This invention will be described and shown as applied, by way of example, to a torque converter transmission having three speeds and a reverse to provide adequate ratio coverage for motor vehicles controlled by a straight forward control system automatically responsive to changes in vehicle speeds and torque requirements for effecting smooth overlap shifts, although the same may find applications in other types of transmission.

The control system to which the invention is directed comprises as customary different valves such as pressure regulating, pressure boosting, throttle, two governors, first-second shift, second-third shift, throttle pressure reducing, second-third timing, second lock, cut-down, solenoid down-shift and throttle backup valves hydraulically coupled with each other for effecting required shifts for automatic operation. The manual selector valve can be set to positions for establishing: (1) a forward drive range (D) in which a plurality of drive ratios are automatically selected in sequence of the first, second and third speed ratios; (2) a second or intermediate speed range (II) for second ratio starts, in which the second speed ratio is maintained until the manual selector valve is set to another position; or (3) a first or low range operation so that the transmission is maintained in this low range position where the vehicle is being driven at a speed below a predetermined level and that the transmission is once maintained in the second speed range position when the vehicle speed exceeds the predetermined level and then is locked up to maintain the first speed ratio when the vehicle decelerates to a speed lower than the predetermined level. The manual selector valve is also manipulated to provide the reverse, parking and neutral positions as usual.

It is a feature of the invention to employ the throttle backup valve hydraulically coupled with the throttle valve in the control system for controlling a line pressure supplied through the throttle valve. For the low range operation, this throttle pressure is increased by the operation of the throttle backup valve so that the transition or shifting of the speed to shift toward a higher side, thus causing the braking on the engine at the first speed ratio to be established at a vehicle speed higher than in the existing control system. As a result, the powerful braking on the engine can be effected as soon as the vehicle starts to decelerate. On the other hand, when an up-shift is to be effected from the first speed ratio in the first range to the second range, the throttle backup valve retards to resume its operating position to cancel the throttle pressure variation to be damped, providing a smooth transition. Thus, the throttle backup valve may be said to provide a kind of hystersis effect.

It is therefore an object of this invention to provide a new and improved automatic multi-ratio transmission.

Another object of the invention is to provide an improved control system for automatically effecting smooth overlap ratio changes with improved performance of the braking on the engine and with reduced mechanical shocks to the vehicle.

Still another object of the invention is to provide a new and improved automatic transmission control system including an improved throttle valve for controlling the throttle pressure both to offer powerful braking on the engine at an early state of deceleration and to smooth the transition from the low speed ratio to the intermediate speed ratio.

A further object of the invention is to provide a new and improved automatic transmission control system including an improved throttle backup valve for controlling the operation of the throttle valve by furnishing modulated pressure to the throttle valve in accordance with the selected position of the manual selector and first-second valves.

These and other objects, features and advantages of this invention will be apparent from the following description, claims and drawings, in which:

Figure 1:
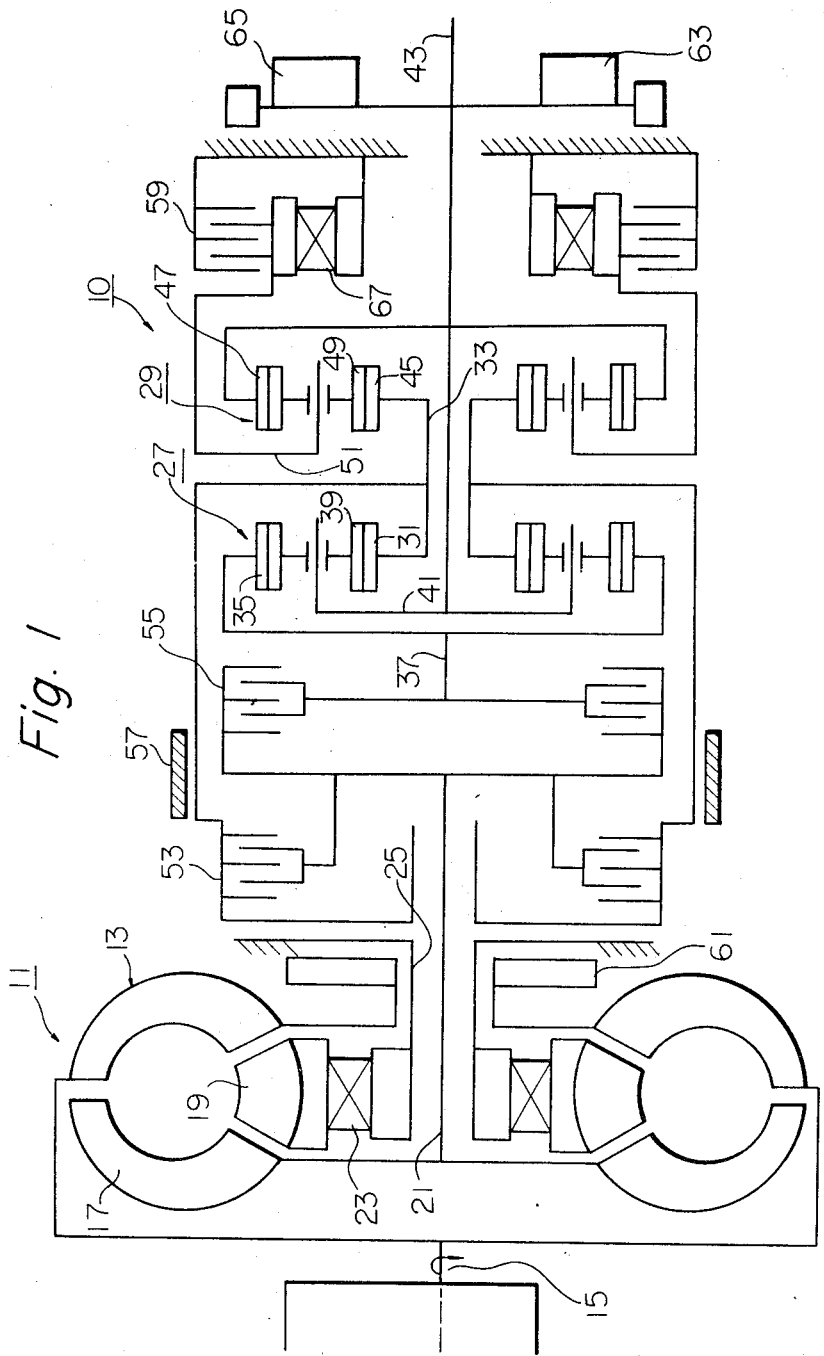
FIG. 1 is a schematic cross-sectional view showing a representative example of a power train of an automatic transmission to which the invention is directed.

The power train of FIG. 1 as indicated generally by numeral 10, comprises a hydrodynamic torque converter 11 having a vaned pump 13 driven by a vehicle power plant (not identified) through a driving shaft 15, a vaned turbine 17 and a stator 19. The turbine 17 and stator 19 are mounted on a transmission input shaft 21 and a one-way brake 23, respectively. The one-way brake 23 is rigidly connected to a stationary sleeve 25 and permits the stator 19 to rotate only in the same direction as the direction of rotation of the driving shaft 15. The torque converter is of conventional type having both torque multiplication and fluid coupling phases of operation. The turbine 17 drives the transmission input shaft 21 to provide an input to first and second planetary gear units 27 and 29, respectively forming part of the transmission power train.

The first planetary gear unit 27 includes a sun gear 31 driven by a hollow shaft 33, a ring gear 35 integral with an intermediate shaft 37 and at least one planet pinion 39 meshing with both the sun gear 31 and the ring gear 35 to revolve on the sun gear 31 and ring gear 35 about their common axis. The pinion 39 is mounted on a pinion carrier 41 which is connected to a transmission output shaft 43. The second planetary gear unit 29 includes a sun gear 45 integral with the sun gear 31 and driven by the hollow shaft 33, a ring gear 47 connected to the output shaft 43 and at least one planet pinion 49 meshing with both the sun gear 45 and the ring gear 47 to revolve on the sun gear 45 and ring gear 47 about their common axis. The pinion 49 is mounted on a pinion carrier 51 that is allowed by a one-way brake 67 to rotate in the same direction as the direction of rotation of the driving shaft 15.

The power train 10 further comprises friction elements such as a reverse-and-high speed clutch 53, a forward clutch 55, a second speed brake 57 and a low-and-reverse speed brake 59. As shown, the reverse-and-high speed clutch 53 connects operatively the input shaft 21 to the hollow shaft 33 by means of a drum. The forward clutch 55 functions, when coupled, to connect the input shaft 21 with the ring gear 35 of the first planetary gear unit 27 through the intermediate shaft 37. The second speed brake 57 is adapted to brake, when applied, both of the sun gears 31 and 45. The low-and-reverse brake 59 functions, when applied, to lock the pinion carrier 51 of the second planetary gear unit 29.

In FIG. 1, there are also shown an oil pump 61, first and second governor valves 63 and 65, which are usually installed in a power train of a transmission. The oil pump 61 is driven by the engine by way of the driving shaft 15 and the vaned pump 13. The governor valves 63 and 65 are fixed to the output shaft 43 to provide for speed responsive governor pressures.

With the transmission constructed as described above, the first speed in the D range is established when the forward clutch 55 is coupled to connect the input shaft 21 to the ring gear 35 of the first planetary gear unit 27 with the one-way brake 67 operative to prevent the pinion carrier 51 of the second unit 29 from rotating in the direction reverse to the direction of rotation of the input shaft 21. The input power is then transmitted from the input shaft 21, in one way, to the pinion 39 of the first planetary gear unit 27 through the forward clutch 55 and the ring gear 35 of the first planetary gear unit 27 and, in the other way, to the ring gear 47 of the second planetary gear unit 29 through the sun gears 31 and 45 and the pinion 49 of the second planetary gear unit 29. As a result, the output shaft 43 is driven in the same direction as the direction of rotation of the input shaft 21 at a reduced speed and with increased torque. For overlap shift to the second speed in the D range, the second speed brake 57 is applied with the forward clutch 55 kept coupled, so that the input power is carried from the input shaft 21 to the ring gear 35 of the first planetary gear unit 27 through the forward clutch 55. With the sun gears 31 and 45 held stationary by the second speed brake 57, the pinion 39 of the first planetary gear unit rotates on the sun gear 31 and ring gear 35, thereby rotating the output shaft 43 at an increased speed with reduced torque, as compared with the first speed in the D range. For overlap shift to the third speed in the D range, the reverse-and-high clutch 53 is coupled as the second brake 57 is disengaged, causing the ring gear 35 and sun gear 31 of the first planetary gear unit 27 to be locked. The transmission is thus conditioned for the highest speed range with the gear ratio of 1:1. The reverse speed is established by actuating the reverse-and-high clutch 53 and low-and-reverse brake 59 with all the other friction elements released. The input power is thus carried from the input shaft 21 through the reverse-and-high clutch 53 to the sun gear 45 of the second planetary gear unit 29 by way of the hollow shaft 33. With the carrier 51 of the second planetary gear unit 29 held stationary by the low-and-reverse brake 59, the ring gear 45 of the second planetary gear unit 29 is driven integrally with the output shaft 43 in the reverse direction at a reduced speed.

Figure 2:
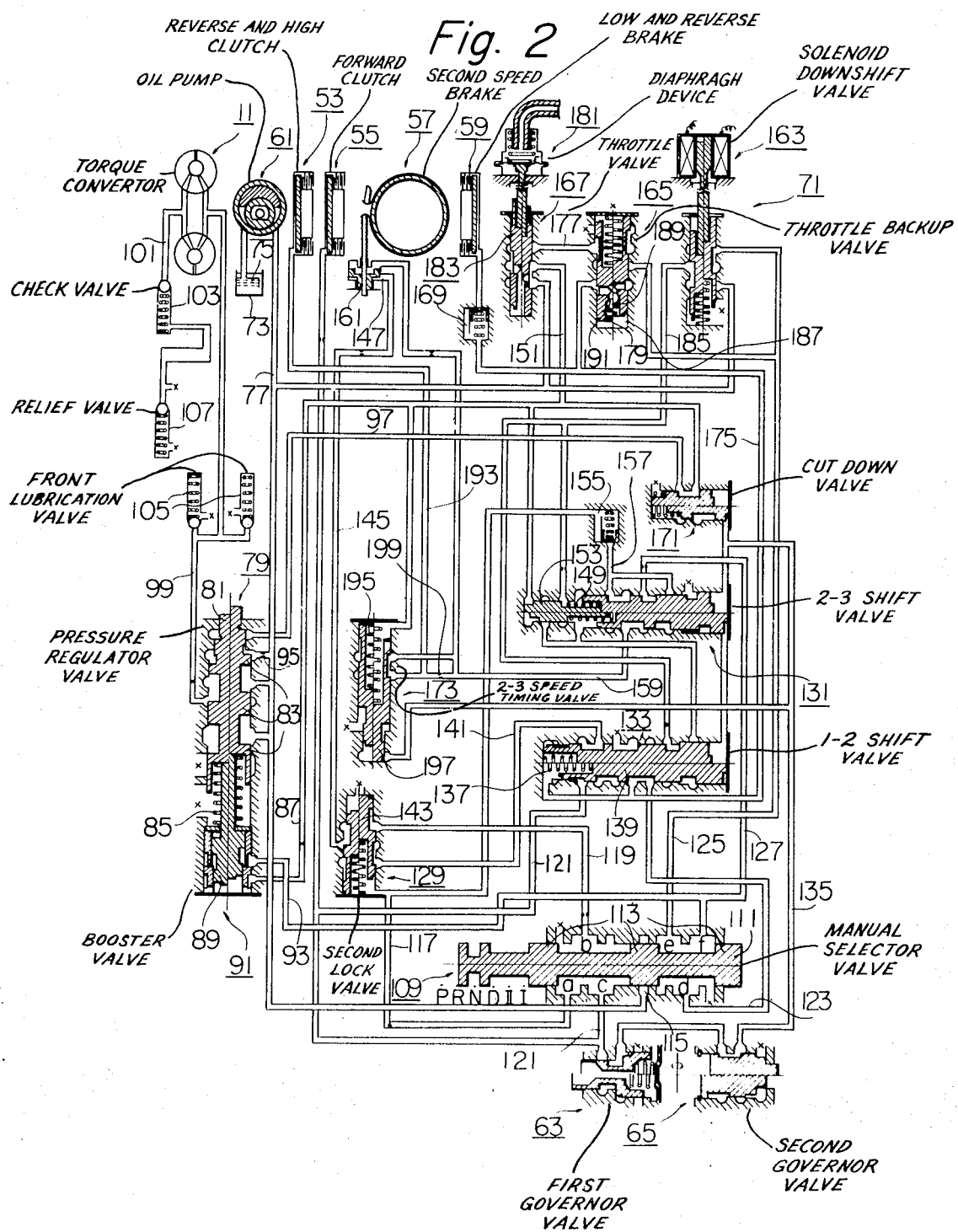
FIG. 2 shows an automatic transmission control system to be used in combination with the power train of FIG. 1.

Now, the selective actuation of the friction elements as discussed above is regulated by a hydraulic control system which is shown in FIG. 2. Here, the valves excepting a manual selector valve are shown as split into two halves to illustrate two corresponding different operative positions.

Referring to FIG. 2, there is shown an improved hydraulic control system, as designated generally by numeral 71, which is constructed and arranged to selectively actuate the friction elements in a manner to meet the varying driving conditions, offering effective braking on the engine in case of deceleration and smooth transition in case of upshift. This control system 71 is powered by the engine driven oil pump 61 which delivers pressurized fluid from a sump 73 through a strainer 75 to a main line pressure passage 77 to produce a main line pressure. The main line pressure passage 77 leads to a pressure regulating valve 79 which operates to regulate the line pressure in accordance with the vehicle speed and torque requirement. This pressure regulating valve 79 includes an axially movable valve spool 81 having a plurality of spaced lands 83 thereon and a compression spring 85. The valve spool 81 is biased in the upward direction of FIG. 1 by the combined pressure of the spring 85 and the throttle pressure in a line 87 transmitted through a spool 89 of a booster valve 91 and a line pressure transmitted enroute a line 93. Opposing to these bias pressures, the valve spool 81 is also biased by a line pressure exerted thereto through an orifice 95 of the line 77 and by a pressure transmitted through a line 97. Designated by passage 99 is a converter feed passage which transmits pressurized fluid to the torque converter 11. The fluid pressure delivered to the torque converter 11 is then introduced into a line 101, where a check valve 103 prevents the fluid pressure from being drained off, thus maintaining a high line pressure. The line pressure in the line 101 is drained past passage marked with X through front lubrication valves 105 and relief valve 107. Throughout all the circuits in the control system, other passages indicated by X also lead to a drain sump (not shown).

Manual selector valve 109 has an elongated axially movable spool member 111 with a plurality of spaced lands 113 which selectively distribute the flow of fluid to the valves to be described. To this manual valve 109 is admitted the main line pressure through an inlet port 115. Outlet ports *a*, *b*, *c*, *d*, *e* and *f* are provided in the valve housing portion of the valve 109. The spool 111 is moved to select the D range to a position in which lines 117, 119 and 121 communicate with the main line pressure passage 77 through the ports *a*, *b* and *c*. In the second or II range, the port *a* is blocked while a line 125 is connected to the line 77 through the port *e*. In the first or I range, the port *b* is closed while the port *d* is open to a line 123. In the reverse speed range, as abbreviated as R in FIG. 2, the port *c* is shut off while the line 77 communicates with a line 127 by way of the port f. In the neutral or N range the spool 111 assumes the position illustrated and the inlet port 115 is blocked to terminate the supply of fluid pressure to any of the other valves.

For operating the transmission, the manual valve selector 109 may be moved to any of the positions shown as P, R, N, D, II and I. When the valve spool 111 is moved to the drive range D, the inlet port 115 is open to a second lock valve 129 and second-to-third speed shift valve 131 via the line 117. The line 77 communicating with the inlet port 115 thus leads to the second lock valve 129. The input line pressure is delivered to a first-to-second speed shift valve 133 and thereafter applied to the forward clutch 55 by way of the line 121, whereby the forward clutch 55 is coupled. As a result, the output shaft 43 is driven at the first speed in the D range (FIG. 1).

As the vehicle speeds up, the governor pressure in a line 135 increases and overcomes the action of a compression spring 137 of the first-to-second speed shift valve 133. As a result, a spool 139 of the first-to-second speed shift valve 133 is moved leftwardly of FIG. 2, connecting the line 121 to a line 141, whereby the fluid pressure is carried to the second lock valve 129. At this instant the pressure difference due to the difference between the effective areas of a second lock valve spool 143 biases the spool upwardly, as shown. The line 141 communicates with a line 145 to engage the second speed brake 57 by actuating a servo applying side 147 thereof, thereby to provide the second speed in the D range, as has been described before.

As the vehicle speed further increases, the governor pressure proportionally increases until it overcomes the combined forces of the action of a spring 149 of the second-to-third speed shift valve 131 and the throttle pressure in a line 151. As shown, this causes a spool 153 of the second-to-third speed shift valve 131 to move leftwardly to connect the line 117 having a one-way orifice 155 to a line 157. The fluid pressure thus delivered through a line 159 is applied to a servo release side 161 of the second brake 57, which consequently is disengaged. This fluid pressure is further fed into the reverse-and-high clutch 53. The vehicle is now driven at the third speed in the D range, and the third-to-second and second-to-first down-shifts are effected when the governor pressure drops and the throttle pressure rises.

When the manual selector valve 109 is set to the second range position for starting at the second speed gear ratio or for deceleration from the third speed in the D range with the line 117 drained off, the second lock valve spool 143 is moved downwardly in the drawing due to the difference between the areas of the side faces of the two lands thereof. The main line pressure is introduced into the line 119 to apply the second brake 57. On the other hand, the fluid pressure in the line 121 fed through the first-to-second speed shift valve 133 causes the forward clutch 55 to engage. At the same time, the line 125 communicates with the solenoid down-shift valve 163 and throttle backup valve 165. The operation of the backup valve 165 will be discussed later in more detail. In the absence of a fluid pressure in the second-to-third speed shift valve 131 with the outlet port a kept closed, the third speed cannot be established even though the vehicle speed increases.

When the manual selector valve 109 is moved to the first speed range position, the lines 121 and 125 function similarly to the case where the second range is selected. With the port d now open, the main line pressure in the line 77 is fed to the first-to-second shift valve through the line 123. The first-to-second speed shift valve spool 139 is moved rightwardly in the drawing against the governor pressure in the line 135 exerted to its end face by the combined force of the line pressure supplied through the passage 185 and the action of the spring 137 so that the low reverse brake 59 is engaged by the line pressure fed through the line 175 having a one-way orifice 169. Under these conditions, the transmission remains in the low speed range position until the manual selector valve 109 is moved to another position or until the driving conditions are changed. This change in the driving condition is closely related to the operation of the throttle backup valve 165 according to this invention, which will be discussed in detail in conjunction with other valves such as the solenoid down-shift valve 163, a cut-down valve 171 and a second-to-third speed timing valve 173.

With the first speed thus maintained, powerful braking on the engine is effected when the pinion and therefore the sun gear of the second planetary gear unit are driven by the output shaft, as shown in FIG. 1.

When the manual selector valve 109 is shifted to the reverse range position, the low-and-reverse brake 59 is applied similarly to the case where the first speed range is selected. However, the reverse-and-high clutch 53 is also effected by the line pressure supplied through the line 127 and the second-to-third speed shift valve 131. The operations of these brake and clutch condition the transmission for the reverse drive.

The conditions of the friction elements to provide the above-mentioned operations of the transmission are tabulated below, wherein the sign "+" means that the friction element is actuated and the sign "−" means that the friction element is kept released.

| Speed Range | | Example of Gear Ratios | Friction Elements | | | | Engine Braking Effect |
|---|---|---|---|---|---|---|---|
| | | | 53 | 55 | 59 | 67 | |
| | 1st | 2.45 | − | + | − | − | + None |
| D | 2nd | 1.45 | − | + | + | − | − Medium |
| | 3rd | 1.00 | + | + | − | − | − Small |
| II | | 1.45 | − | + | + | − | − Medium |
| I | 1st | 2.45 | − | + | − | + | − Large |
| | 2nd | 1.45 | − | + | + | − | − Medium |
| R | | 2.18 | + | − | − | + | − Large |

Now, the throttle backup valve according to the invention will be described by referring to the operations of the first-to-second speed shift valve 133 and the throttle vacuum sensitive valve 167 in relation to other valves shown.

When the manual selector valve 109 is shifted to the second speed range position, the fluid pressure fed through the outlet port e is passed to the throttle valve 167 by way of the line 125, backup valve 165 and throttle drain line 177. This fluid pressure is modulated by the backup spool 179 shown on the left-hand side of FIG. 2. The throttle valve 167 usually operates, in the absence of a fluid pressure passed thereto, to control the throttle pressure under the influence of the throttle vacuum acting on the diaphragm of a diaphragm device 181. In this instance, however, a throttle valve spool 183 is held in the raised position in the drawing with the fluid pressure exerted thereto through the line 177. As a result, the drain line 177 communicates with the line 151, thus feeding boosted throttle pressure thereto. This pressure is higher than the usual throttle pressure obtaining under full throttle conditions. Therefore, the pressure regulating valve spool 81 is moved upwardly to provide a higher fluid pressure. The first-to-second speed shift valve 133 receives this increased fluid pressure through line 185 originating in the solenoid down valve 163 as well as the increased throttle pressure. This condition is maintained until the manual selector valve 109 is shifted to the first speed position in the first speed range. As a result, the overlap shifting or transition point from the second to the first speed in the first speed range can be deviated forward a predetermined higher level. This is because, at the second speed in the first range, the first-to-second speed shift valve spool 139 is forced rightwardly due to the increased throttle pressure. More specifically, the line and throttle pressures, combined with the action of the spring 137, overcome, even at the predetermined high level, the governor pressure exerting reversely to the valve spool 139. In other words, the first-to-second speed shift valve 133 remains in the rightmost position even when an increased governor pressure is exerted thereto and therefore the braking on the engine becomes more powerful and effective than the conventional control system which is void of the throttle backup valve.

When the vehicle decelerates to the first speed in the first range, the line pressure is introduced into the backup valve 165 through the first-to-second speed shift valve 133 with the spool 139 held in the rightmost position with the fluid pressure passed thereto by way of the line 175. This line pressure acts to lock up the backup spool 179 upwardly, thus draining the pressure in the throttle drain line 177. As a result, the spool 183 of the throttle valve 167 is moved from its lock position, providing a throttle pressure which is equal to the main line pressure.

When the manual selector valve 109 is shifted back to the second range position, the pressure in the line 123 is drained to the manual selector valve 109 and reduced to a lower level. In this instance, however, the pressure forcing the backup spool 179 upwardly is not drained at once. This is because the fluid existing in a chamber 187 of the backup valve 165 is kept unreleased for a while with a check ball 189 seated on a valve seat 191 to press the spool 179. As a result, the throttle pressure stays for a while at a usual level corresponding to that of the main line pressure, causing the modulating action of the backup valve 165 to delay. It should be appreciated in this instance that the mechanical shocks resulting from the gear shifting are reduced when upshift from the first to the second speed in the first range is accomplished. More specifically, engagement of the second brake 57 proceeds slowly.

Here, the cut-down valve 171 and second-to-third speed timing valve 173 will be discussed briefly. The cut-down valve 171 is operated by the governor pressure and controls the main line pressure by feeding the throttle pressure to the pressure regulating valve 79 through the line 97 when the governor pressure is high. The second-to-third speed timing valve 173 closes or opens the bypass passage of a line 193 leading to the reverse-and-high clutch 53 in accordance with the vehicle speeds and throttle vacuums. When the governor pressure overcomes the combined force of the throttle pressure and the action of a spring 195, a second-to-third speed timing valve spool 197 is held in its raised position in the drawing. This causes the line pressure fed through the line 193 to be bypassed through an orifice 199 and to be damped accordingly.

Figure 3:
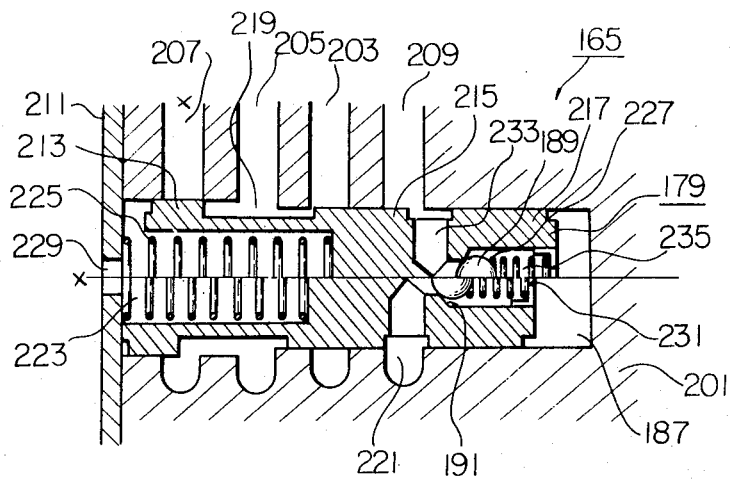
FIG. 3 is a cross-sectional view showing a throttle backup valve of the control system of the invention.
Figure 4:
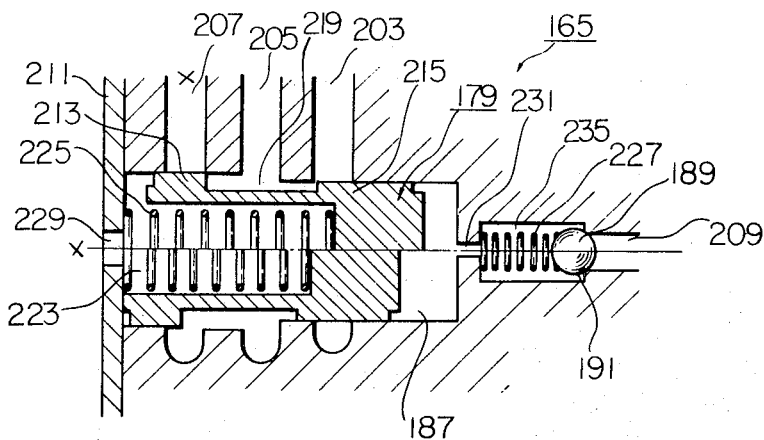
FIG. 4 is similar to FIG. 3 but shows another form of the throttle backup valve.

Construction arrangements and operations of the throttle backup valve 165 will be more fully understood with reference to FIGS. 3 and 4.

In FIG. 3, the throttle backup valve 165 comprises cylindrically bored housing 201 having forward therein four ports 203, 205, 207 and 209 spaced from each other and drained cap board 211 at its one end. The axially movable spool 179 is accommodated in the bore of the housing 201. The first port 203 is adapted to introduce the line pressure into the bore of the housing 201, the second port 205 to feed modulated pressure to the throttle vacuum sensitive valve 167, the third port 207 to act as a drain port and the fourth port 209 to introduce a pilot pressure to close the port 203. The movable spool 179 has three lands 213, 215 and 217 and two grooves 219 and 221 formed therebetween. The lands 213 and 215 are sized and positioned respectively relative to the ports 207, and 203 and 209 so as to open and close the same when the driving conditions are changed. In the spool 179 are formed two chambers 223 and 235 with two springs 225 and 227, respectively, accommodated therein. The chamber 223 is drained through a drain port 229. The chamber 235 has mounted therein the check ball 189 and the spring 227 to force the ball against the seat 191 and is opened at its outer end through a port 231 into the chamber 187 defined by the housing 201. A passage 233 is formed in the spool 179 to provide communication between the chamber 235 and the port 209.

When, in operation, shift is accomplished from the D to second ranges, the line pressure is introduced into the port 203 and the spool 179 is positioned as shown as the upper half thereof by the action of the spring 225. At this instant, the line pressure is throttled through an annular passage formed between the port 203 and the land 215. This throttled or modulated pressure is delivered to the port 205 leading to the throttle valve 167.

When the vehicle speed becomes lower than a predetermined level after down-shift from the second to the first range is accomplished, the line pressure fed through the port 209 is introduced into the chamber 235 past the check ball 189 against the action of the spring 227 and further into the chamber 187 through the port 231. This line pressure moves the spool 179 leftwardly against the action of the spring 225, thereby maintaining the spool 179 in the position shown by the lower half thereof. Under this condition, the fluid is precluded from passing the port 203 to the port 205 and at the same time the pressure in the port 205 is drained from the port 207.

When the manual selector valve 109 is moved or shifted up from the first (in the first speed range) to the second range position, the line pressure in the port 209 is drained into the manual selector valve 109 through the line 175. The pressure in the two chambers 235 and 187, however, is not reduced fast. This is because the check ball 189 is forced against the ball seal 191 and the clearance therebetween is substantially negligible for a while. On the other hand, drainage of fluid in the chambers 235 and 187 proceeds progressively through the appreciably increasing clearance to reduce the pressure therein. When a predetermined pressure level is reached, the spring 225 overcomes the fluid pressure and the spool 179 is moved rightwardly to resume its initial position, whereby the throttle pressure is increased.

A modified form of the throttle backup valve is illustrated in FIG. 4. The modified backup valve is essentially similar in construction and operation and, as such, like reference numerals are allocated to like parts. In the backup valve 165 shown in FIG. 4, however, the spool 175 has two lands 213 and 215 and groove 219 formed therebetween and receives the pressure in the chamber 187 by way of the port 231. The operations of this embodiment are similar to those discussed before and discussion thereof is omitted here.

It will now be appreciated that the control system according to the invention offers effective braking on the engine at an early stage of deceleration and smooth transition from the first to the second range.

It will be also understood that the control system of the invention may be used in any suitable type of transmissions, and further that modifications may be made to the preferred embodiments described above which would be obvious to those skilled in the art. Accordingly this invention is not to be limited to the construction and arrangement particularly shown and described, but only by the claims which follows.

What is claimed is:

1. A throttle back-up valve for use in a hydraulic control system of a transmission of a motor vehicle driven by an engine, which control system includes a source of fluid pressure, a pressure regulator valve communicating with said source of fluid pressure for regulating said fluid pressure to a line pressure a manual selector valve communicating with said regulator valve and having a plurality of positions including Drive speed range, intermediate speed range and low speed range, a first-to-second speed shift valve communicating with said manual selector valve for effecting shifting between low and intermediate speed gear ratios and a throttle vacuum sensitive valve responsive to changes in an intake manifold vacuum of the engine for supplying a throttle pressure to said first-to-second speed shift valve to change the downshift point between the intermediate to low speed ratio, comprising: a housing defining a cylindrical bore and having a first port communicating with said manual selector valve, a second port communicating with said throttle vacuum sensitive valve, a drain port communicable with said second port and a third port communicating with said first-to-second speed shift valve; a valve spool axially movably accommodated in said bore for selectively establishing fluid communication between said first, second, drain and third ports; and ball valve means having a valve chamber communicating with said cylindrical bore at one end thereof, a valve seat formed at the other end of said valve chamber, a ball member accommodated in said valve chamber, a spring accommodated in said valve chamber for biasing said ball member toward said valve seat, wherein said first port introduces into said bore a line pressure supplied from said manual selector valve when said manual selector valve is shifted to the second speed range position, said second port is in restricted fluid communication with said first port when said first-to-second speed shift valve is at its upshifted position, for supplying a modulated pressure which is lower than said fluid pressure in said first port to said throttle vacuum sensitive valve, thereby boosting a throttle pressure to be supplied to said first-to-second speed shift valve, said drain port drains said modulated pressure when said drain port is in fluid communication with said second port, said third port communicates with said valve chamber for introducing a pilot pressure supplied from said first-to-second speed shift valve into said valve chamber by biasing said ball member away from valve seat against the action of said spring during downshift from intermediate to low speed ratio, said pilot pressure being further introduced into said cylindrical bore and urging said valve spool to a locked position for keeping said spool at said position when said downshift is completed, said pilot pressure being gradually drained through a small clearance between said ball member and said valve seat during manual upshift from low to intermediate speed ranges for thereby retarding recovery of said valve spool from said locked position, whereby shock due to abrupt increase in line pressure is prevented during said upshift.

2. A throttle back-up valve according to claim 1, wherein said ball valve means is provided in said valve spool.

3. A throttle back-up valve according to claim 1, wherein said ball valve means is provided in said housing.

* * * * *